2 Sheets—Sheet 1.

A. E. KARSNER.
Roof and Stock-Pen for Platform-Scales.

No. 196,152. Patented Oct. 16, 1877.

WITNESSES:
C. Neveux
J. H. Scarborough

INVENTOR:
A. E. Karsner
BY Munn & Co
ATTORNEYS.

2 Sheets—Sheet 2.

A. E. KARSNER.
Roof and Stock-Pen for Platform-Scales.

No. 196,152. Patented Oct. 16, 1877.

WITNESSES:
C. Neveux
J. H. Scarborough

INVENTOR:
A. E. Karsner
BY Munn & Co
ATTORNEYS.

UNITED STATES PATENT OFFICE.

ADAM E. KARSNER, OF FLORIDA, OHIO.

IMPROVEMENT IN ROOF AND STOCK-PEN FOR PLATFORM-SCALES.

Specification forming part of Letters Patent No. 196,152, dated October 16, 1877; application filed September 10, 1877.

*To all whom it may concern:*

Figure 1:
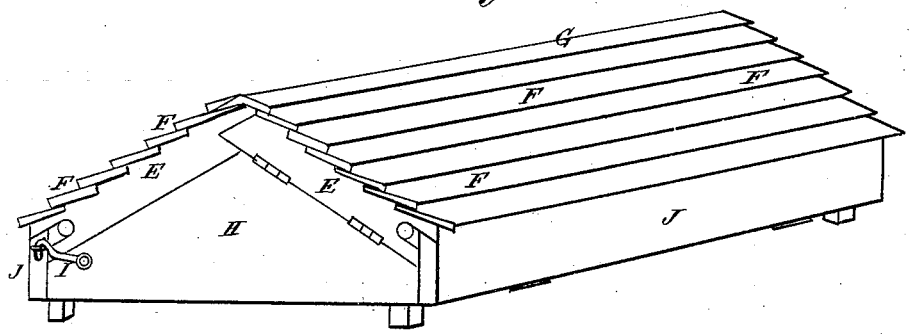
Figure 2:
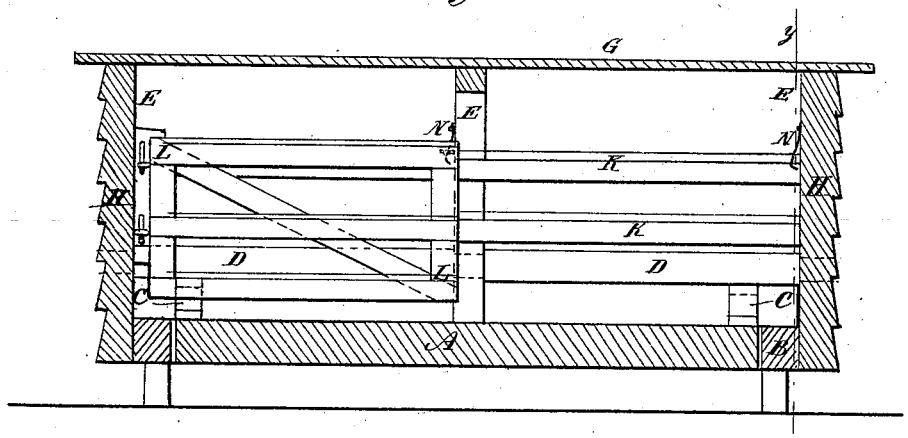
Figure 3:
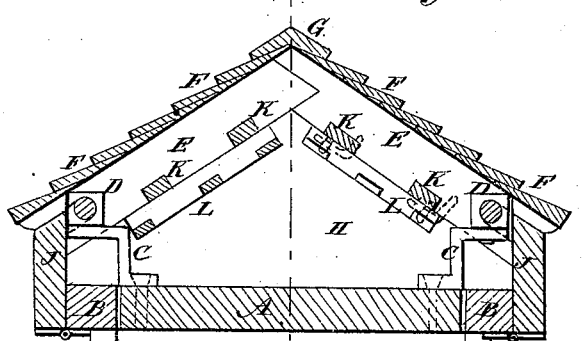
Figure 4:
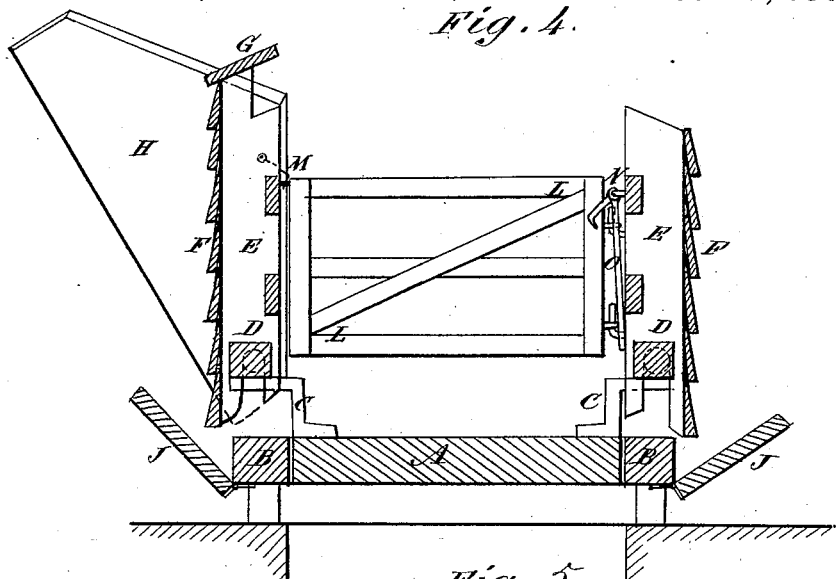
Figure 5:
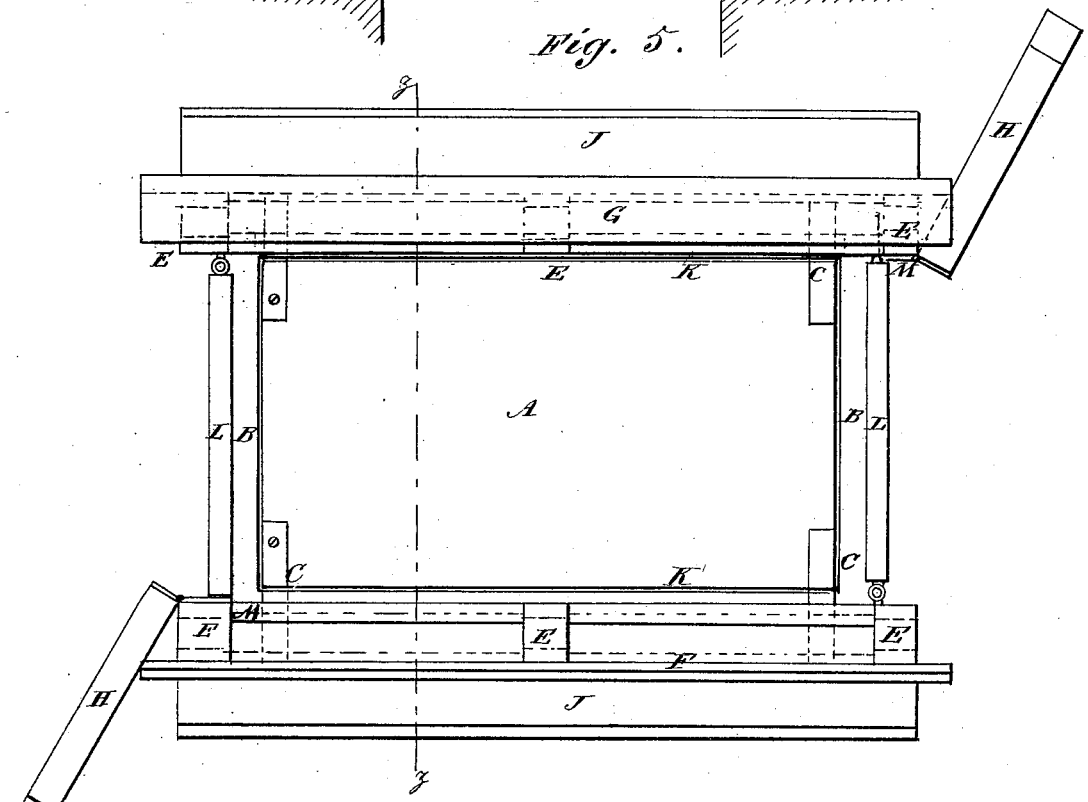

Be it known that I, ADAM EMANUEL KARSNER, of Florida, in the county of Henry and State of Ohio, have invented a new and useful Improvement in Combined Folding Roof and Stock-Pen for Platform-Scales, of which the following is a specification:

Figure 1, Sheet 1, is a perspective view of my improved device arranged as a roof. Fig. 2, Sheet 1, is a vertical longitudinal section of the same, taken through the line $x\,x$, Fig. 3. Fig. 3, Sheet 1, is a vertical cross-section of the same, taken through the line $y\,y$, Fig. 2. Fig. 4, Sheet 2, is a vertical cross-section of the same, arranged as a stock-pen, taken through the line $z\,z$, Fig. 5. Fig. 5, Sheet 2, is a top view of the same.

Similar letters of reference indicate corresponding parts.

The object of this invention is to furnish an improved structure which shall be so constructed as to cover a platform-scales and protect it from the weather, which may be arranged to receive stock when being weighed, which may be turned back out of the way when loads of hay or other material are to be weighed, and which shall be simple in construction, inexpensive in manufacture, convenient in use, and will secure accuracy in weighing.

The invention consists in the combination of the brackets, the pivot-bars, the hinged parts of the roof, the triangular doors, the side-boards, and the gates with each other, and with the platform of a platform-scales, as hereinafter fully described.

A represents the platform of the scales, and B is the frame that surrounds it.

To the platform A, at or near its four corners, are attached the lower arms of the brackets or knees C. The upper arms of the brackets C project outward, and to them are attached directly above the side bars of the frame B, the two bars D, upon which are formed journals to receive and serve as hinges to the rafters E.

F are the covering-boards, which are attached to the rafters E to form the roof. The upper ends of the rafters E upon one side are notched to receive the ends of the rafters of the other side. To the upper ends of the rafters of one side is attached an inclined ridge-board, G, which overlaps the upper edge of the other side of the roof, when the two sides are closed together, as shown in Figs. 1 and 3.

The triangular spaces at the ends of the roof are closed by the triangular doors H, which are hinged at one of their inclined edges to the end rafters of one side of the roof, and are secured to the end of the side-boards of the other side, when closed, by hooks and eyes I, or other convenient fastenings.

J are the side-boards, which are hinged at their lower edges to the lower outer corners of the side bars of the frame B. The upper edges of the side-boards J are beveled off, so as, when raised into a vertical position, to enter the lower ends of the notches in the lower ends of the rafters E, and closely close the spaces beneath the lower edges of the roof. To the inner edges of the rafters E are attached bars K, which form the side bars of the stock-pen, and protect the roof-boards F from being knocked off or injured by the stock. To the alternate end rafters E are hinged the end of the gates L, which are made of such a length as to reach from one part of the roof to the other, when the two parts are in a vertical position, and are secured in place by hooks and eyes M. When not in use the gates L are turned back against the bars K of the sides of the roof to which they are hinged, and are secured in place by hooks and eyes N, or other convenient fastenings.

O is a brace-rod, which is hinged at its upper end to the upper middle part of one side of the roof, so that when the said part is turned down into an inclined position, the lower end of the said brace-rod may swing forward and rest upon the platform A, to support the said part of the roof until the other part is turned down into place.

When the device is adjusted as a roof, and it is desired to adjust it as a stock-pen, the hooks I are unfastened, the end doors H are turned up, and the side-boards J are turned down into a horizontal position. The two parts of the roof are then raised into a vertical position, and the gates L are swung across and fastened with the hooks M, and the stock-pen is formed. By this construction the stock cannot affect the accuracy of the weighing by leaning against the sides of the pen.

When hay or other bulky loads are to be weighed, the gates L are secured against the inner sides of the parts of the roof, and the said parts are turned outward into an inclined position, so as to be out of the way of the load.

Having thus described my invention, what I claim as new, and desire to secure by Letters Patent, is—

The combination of the brackets C, the pivot-bars D, the hinged parts E F of the roof, the triangular doors H, the side-boards J, and the gates L with each other, and with the platform A of a platform-scales, substantially as herein shown and described.

ADAM EMANUEL KARSNER.

Witnesses:
GEO. C. WEAVER,
A. J. SCOFIELD.